UNITED STATES PATENT OFFICE.

FRIEDRICH THIES, OF BISSENDORF, HANOVER, GERMANY.

VEHICLE FOR PAINTS.

SPECIFICATION forming part of Letters Patent No. 226,372, dated April 6, 1880.

Application filed January 6, 1879. Patented in England June 29, 1878.

*To all whom it may concern:*

Be it known that I, FRIEDRICH THIES, of Bissendorf, in Hanover, Germany, have invented a new and useful composition to be used as a substitute for oil in paints, which is fully described in the following specification.

My invention is a preparation for the manufacture of oil-colors, compounded and possessing advantages as will be hereinafter fully set forth.

In carrying out my invention I take one hundred parts of colophony and twenty parts of crystallized soda, and dissolve or melt them in fifty parts of water, with which I combine twenty-four parts of fluid ammonia united with two hundred and fifty parts of water, all then being well mixed together.

The colophony is free from turpentine, and the fluid ammonia must be chemically pure.

The resultant mass has the consistence of sirup, and may be used with great success for painting purposes in lieu of linseed-oil, and in a manner similar to linseed-oil or turpentine.

This composition may be used with any suitable pigment. It entirely takes the place of the linseed-oil thus ordinarily used.

The compound dries thoroughly and with rapidity without the addition of a drier, and may be readily coated with varnish. It withstands changes of temperature. It will keep under water as well as in dry places, and becomes thoroughly hard without being brittle. It may be readily thinned with water and to any consistence therewith, and while exceedingly durable it is produced at but small cost compared with that of linseed-oil, &c.

I am aware that it is not new to combine or mix soda with rosin, such a composition being shown in English Patent No. 35 of 1862. I am also aware that it is not new to combine or mix salts of tartar, borax, rosin, soda, and additional substances, such a composition being shown in English Patent No. 3,050 of 1864. I do not claim either of the aforesaid compositions.

I am also aware that resinous saponaceous compounds have heretofore been used as substitutes for drying oils in paints, whereby the paints acquire no improper hardness and dry remarkably fast. I do not broadly claim such a composition.

What I do claim is—

The oil substitute consisting of colophony free from turpentine, crystallized soda, pure fluid ammonia, and water, substantially in the proportions and for the purpose set forth.

FRIEDRICH THIES.

Witnesses:
C. F. KÖHLER,
A. M. SIMONS.